United States Patent
Abbatiello et al.

(10) Patent No.: US 10,022,909 B2
(45) Date of Patent: Jul. 17, 2018

(54) SYSTEMS AND METHODS FOR MANUFACTURING STRUCTURAL MATERIALS

(71) Applicant: Dell Products L.P., Round Rock, TX (US)

(72) Inventors: Nicholas D. Abbatiello, Round Rock, TX (US); Chuan Beng Sim, Shanghai (CN); Xin Hua Tian, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 14/592,066

(22) Filed: Jan. 8, 2015

(65) Prior Publication Data

US 2016/0200037 A1  Jul. 14, 2016

(51) Int. Cl.
| | | |
|---|---|---|
| *B29C 65/70* | (2006.01) | |
| *B29C 43/18* | (2006.01) | |
| *B29K 101/10* | (2006.01) | |
| *B29L 9/00* | (2006.01) | |
| *B29L 31/34* | (2006.01) | |
| *B29C 37/00* | (2006.01) | |

(52) U.S. Cl.
CPC ............. *B29C 65/70* (2013.01); *B29C 43/18* (2013.01); *B29C 43/184* (2013.01); *B29C 37/0025* (2013.01); *B29C 2037/0042* (2013.01); *B29K 2101/10* (2013.01); *B29L 2009/00* (2013.01); *B29L 2031/3481* (2013.01)

(58) Field of Classification Search
CPC ......... B29C 65/70; B29C 39/00; B29C 43/00; B29K 2101/10; B29L 2009/00; H05K 5/0243

USPC .................................................. 156/244.23
See application file for complete search history.

(56) References Cited

U.S. PATENT DOCUMENTS

| | | | | | |
|---|---|---|---|---|---|
| D603,359 S | * | 11/2009 | Cui | ...................... | D14/138 AB |
| 7,910,205 B2 | * | 3/2011 | Wang | ................ | B29C 45/14811 |
| | | | | | 428/343 |
| D761,773 S | * | 7/2016 | Choi | ........................... | D14/248 |
| 2002/0106952 A1 | * | 8/2002 | Hashizume | ....... | B29C 45/14221 |
| | | | | | 442/43 |
| 2004/0155380 A1 | * | 8/2004 | Kendall | ................ | B29C 67/246 |
| | | | | | 264/257 |

(Continued)

*Primary Examiner* — Philip Tucker
*Assistant Examiner* — Vicki Wu
(74) *Attorney, Agent, or Firm* — Jackson Walker L.L.P.

(57) ABSTRACT

In accordance with embodiments of the present disclosure, a method for forming a structural member may include providing a sheet of structural material and compression molding an in-mold decoration film to a side of the sheet of structural material.

In accordance with these and other embodiments of the present disclosure, a method for forming a structural member may include providing a sheet of structural material and adhesively bonding a chassis attachment frame to the sheet of structural material, the chassis attachment frame having one or more attachment features for mechanically coupling the structural member to other one or more other components.

In accordance with these and other embodiments of the present disclosure, a method for forming a structural member may include providing a sheet of structural material and molding a chassis attachment frame comprising sheet molding compound to the structural material.

13 Claims, 5 Drawing Sheets

(56) References Cited

U.S. PATENT DOCUMENTS

| | | | |
|---|---|---|---|
| 2010/0279073 A1* | 11/2010 | Tsao | B29C 45/1418 428/172 |
| 2011/0017385 A1* | 1/2011 | Liu | B29C 33/424 156/196 |
| 2011/0089792 A1* | 4/2011 | Casebolt | B29C 45/14311 312/223.2 |
| 2011/0236577 A1* | 9/2011 | Law | B29C 45/1671 427/256 |
| 2013/0032601 A1* | 2/2013 | Li | B29C 45/14344 220/601 |
| 2013/0330978 A1* | 12/2013 | Schwalbach | H01R 24/68 439/669 |
| 2014/0177138 A1* | 6/2014 | Jolliffe | H05K 5/0086 361/679.01 |
| 2014/0182875 A1* | 7/2014 | Sprenger | B29C 45/14336 174/50 |

* cited by examiner

SYSTEMS AND METHODS FOR MANUFACTURING STRUCTURAL MATERIALS

TECHNICAL FIELD

The present disclosure relates in general to information handling systems, and more particularly to forming structural parts for information handling systems, including chasses and other structural components.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many structural components of information handling systems, such as chasses, and in particular such structural components visible from the exterior of information handling systems, may be manufactured with materials and processes intended to be aesthetically pleasing to a consumer. For example, carbon fiber material thermoset in plastic is often used in information handling system chasses. However, current processes for manufacturing such components is often hampered with inefficiency and lower-than-desired yields.

For example, in existing approaches, an information handling system chassis is often manufactured by forming a carbon-fiber reinforced polymer which is then subject to an insertion molding process in which features of a chassis are formed on the carbon-fiber reinforced polymer (e.g., mechanical components for coupling other components of the information handling system to the chassis) using a resin adhesive. One problem with the insertion molding process is that as the resin cools, it may shrink or distort the carbon-fiber reinforced polymer, requiring a step of flattening the part after insertion molding. Excessive distortion may lead to large gaps in the final assembly, and a poor aesthetic.

As another example, in existing approaches, a painting process may be used to improve aesthetics of the carbon-fiber reinforced polymer (e.g., to cover surface defects of the carbon-fiber laminate). Surface painting adds time and cost to manufacturing, and defects in the painting process (e.g., particle contamination) may lead to decreased yields.

SUMMARY

In accordance with the teachings of the present disclosure, the disadvantages and problems associated with manufacturing chassis components may be reduced or eliminated.

In accordance with embodiments of the present disclosure, a method for forming a structural member may include providing a sheet of structural material and compression molding an in-mold decoration film to a side of the sheet of structural material.

In accordance with these and other embodiments of the present disclosure, a method for forming a structural member may include providing a sheet of structural material and adhesively bonding a chassis attachment frame to the sheet of structural material, the chassis attachment frame having one or more attachment features for mechanically coupling the structural member to other one or more other components.

In accordance with these and other embodiments of the present disclosure, a method for forming a structural member may include providing a sheet of structural material and molding a chassis attachment frame comprising sheet molding compound to the structural material.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 8, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Figure 1:
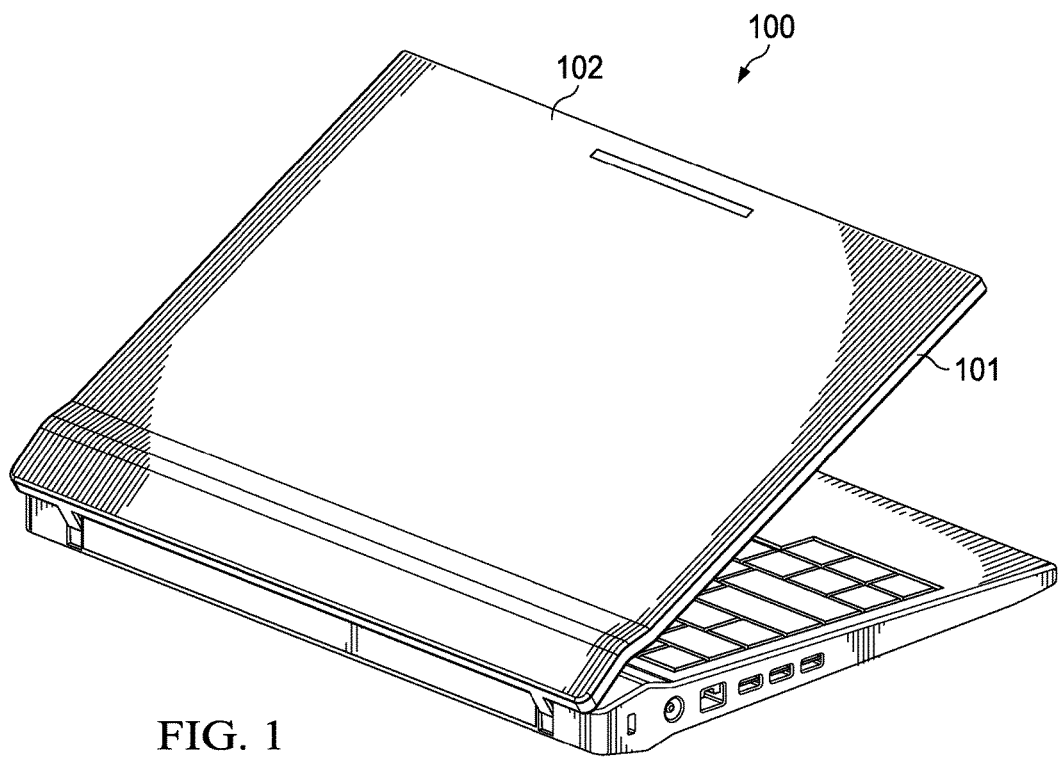
FIG. 1 illustrates an example information handling system, in accordance with certain embodiments of the present disclosure.

FIG. 1 illustrates an example information handling system 100, in accordance with certain embodiments of the present disclosure. Although FIG. 1 depicts information handling system 100 as a laptop or notebook computer, information handling system 100 may comprise any type of information handling system. For example, in some embodiments, information handling system 100 may be a mobile device sized and shaped to be readily transported and carried on a person of a user of information handling system 100 (e.g., a smart phone, a tablet computing device, a handheld computing device, a personal digital assistant, a notebook computer, etc.). In other embodiments, information handling system 100 may comprise a desktop or tower computer. In yet other embodiments, information handling system 100 may comprise a server or server enclosure.

As shown in FIG. 1, information handling system 100 may comprise a chassis 101. In general, a chassis 101 may comprise one or more structural members configured to enclose information handling resources (e.g., processors, memories, etc.) of information handling system 100 and provide structural strength in order to protect the various information handling resources of information handling system 100 from damage. As also depicted in FIG. 1, chassis 101 may comprise one or more structural members 102. In some embodiments, such one or more structural members 102 may comprise a thermoset carbon fiber-reinforced polymer, other fiber reinforced polymer, or other layered composite structural material.

Figure 2:
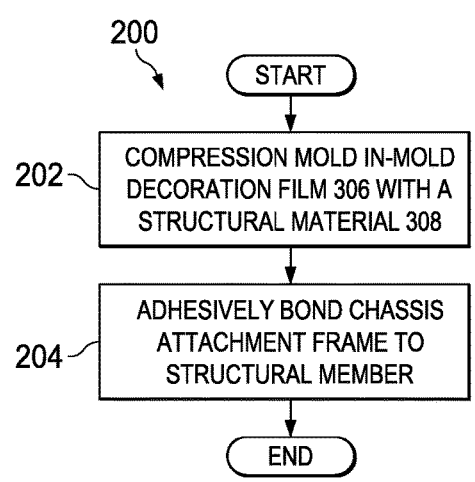
FIG. 2 illustrates a flow chart of an example method for forming a chassis structural member, in accordance with certain embodiments of the present disclosure.

FIG. 2 illustrates a flow chart of an example method 200 for forming a chassis structural member 102, in accordance with certain embodiments of the present disclosure. According to some embodiments, method 200 may begin at step 202. However, the preferred initialization point for method 200 and the order of the steps comprising method 200 may depend on a chosen implementation.

Figure 3:
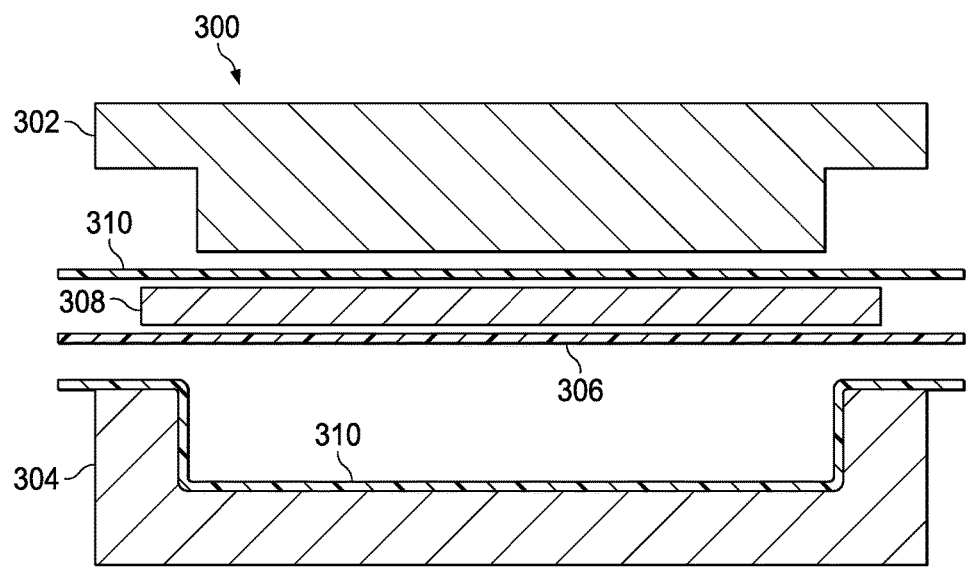
FIG. 3 illustrates a cross-sectional elevation view of a system for compression molding of various material layers that may be laminated to form a chassis structural member, in accordance with certain embodiments of the present disclosure.
Figure 4:
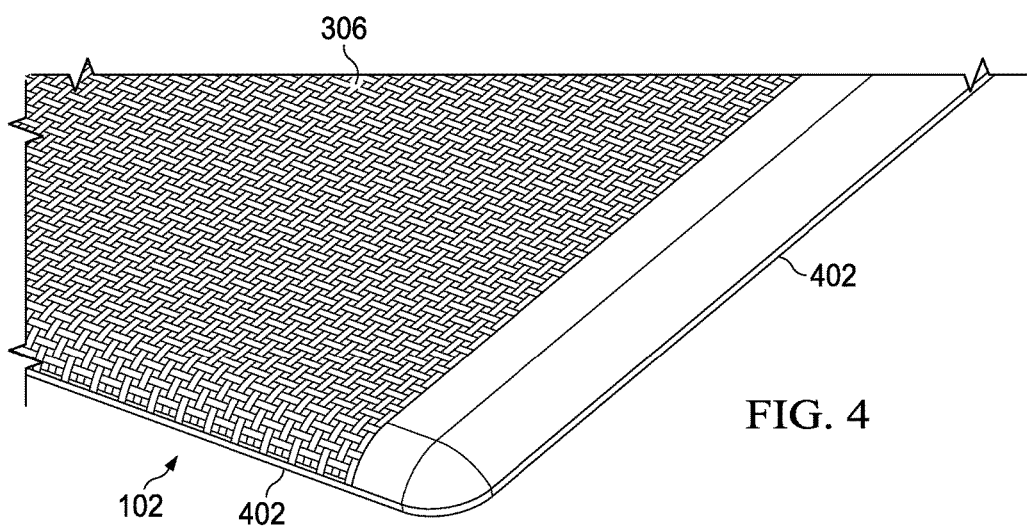
FIG. 4 illustrates an isometric view of an exterior of a structural member with an in-mold decoration layer bonded thereto, in accordance with certain embodiments of the present disclosure.

At step 202, and as pictorially shown in FIG. 3, a compression molding system 300 having a top mold 302 and a bottom mold 304 may be used to compression mold an aesthetically-pleasing in-mold decoration film 306 with a sheet of structural material 308. In-mold decoration film 306 may include an adhesive on one side for bonding to structural material 308. Structural material 308 may comprise a thermoset carbon fiber-reinforced polymer, other fiber-reinforced polymer, or other layered composite structural material. As shown in FIG. 3, release films 310 may also be applied between top mold 302 and structural material 308 and between bottom mold 304 and in-mold decoration film 306 in order allow the compression-molded in-mold decoration film 306 and structural material 308 combination to be released from compression molding system 300. Compression molding may be achieved by applying heat and/or pressure to the materials placed within compression molding system 300. After compression molding is completed, structural material 308 may then include a decorative layer of in-mold decoration film 306 bonded to its surface, as shown in FIG. 4, rather than requiring paint to provide an aesthetically-pleasing exterior surface. Also as shown in FIG. 4, in some embodiments, one or more of top mold 302 and bottom mold 304 may be shaped so that protruding side walls 402 may be formed in structural material 308, with such side walls 402 being covered by in-mold decoration film 306.

Figure 5:
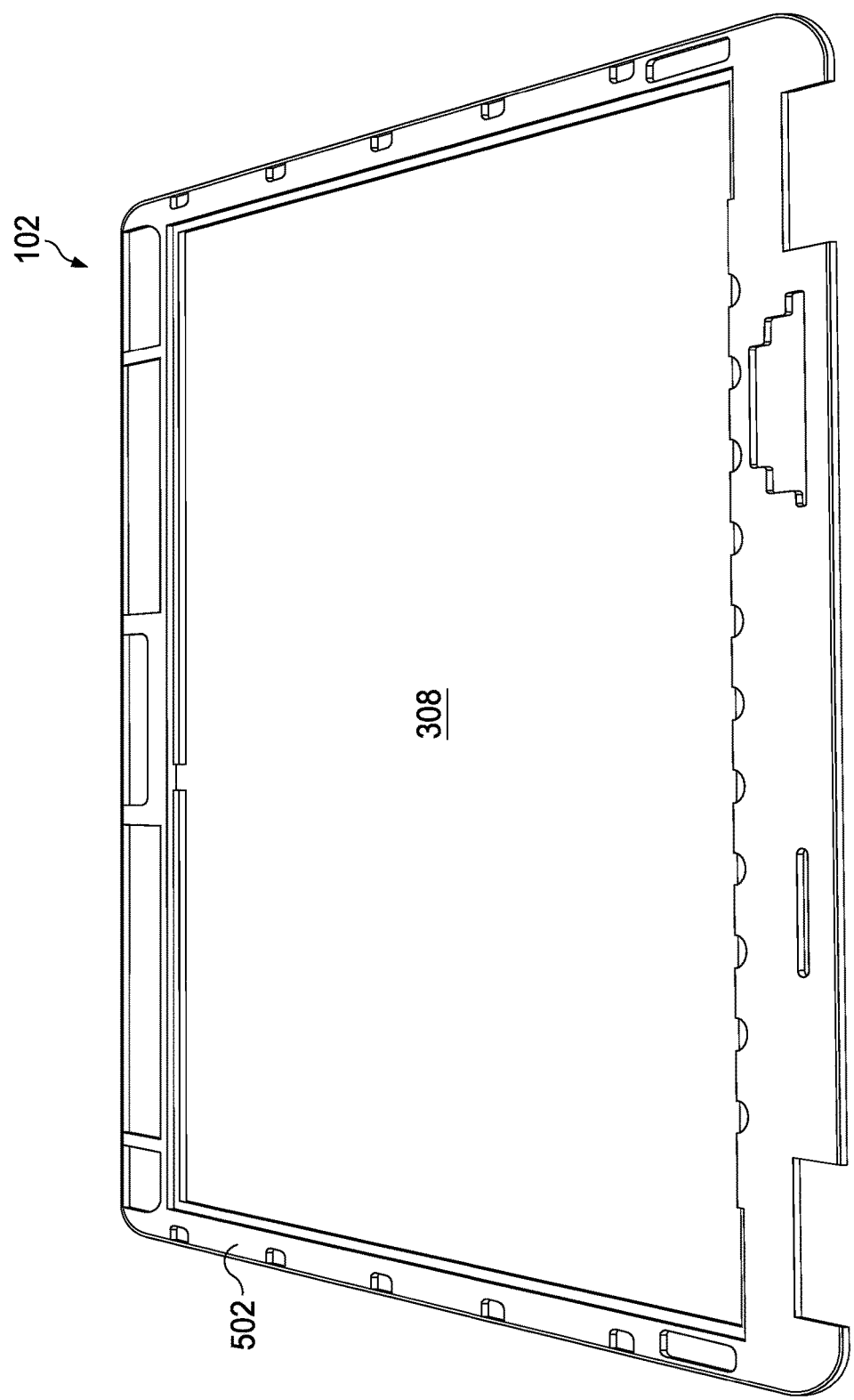
FIG. 5 illustrates a view of an interior of a chassis structural member, with a mechanical attachment frame bonded thereto, in accordance with certain embodiments of the present disclosure.

At step 204, and as pictorially shown in FIG. 5, a chassis attachment frame 502 may be adhesively bonded to on a side of structural material 308 opposite to that which in-mold decoration film 306 is bonded. Chassis attachment frame 502 may comprise plastic, metal, or any other suitable material and may be formed using injection molding, die casting, or other suitable methods. Chassis attachment frame 502 may include one or more mechanical features for coupling structural member 102 to one or more components of information handling system 100. Because chassis attachment frame 502 is attached using bonding instead of insertion molding, warping and distortion of structural material 308 may be reduced or eliminated as compared to traditional approaches.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Figure 6:
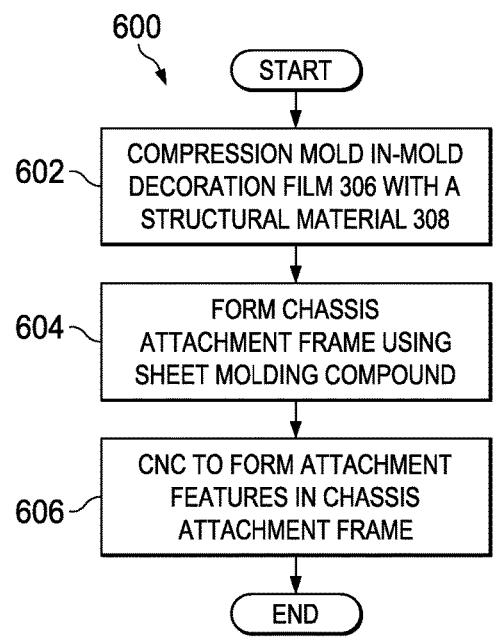
FIG. 6 illustrates a flow chart of another example method for forming a chassis structural member, in accordance with certain embodiments of the present disclosure.

FIG. 6 illustrates a flow chart of another example method 600 for forming a chassis structural member 102, in accordance with certain embodiments of the present disclosure. According to some embodiments, method 600 may begin at step 602. However, the preferred initialization point for method 600 and the order of the steps comprising method 600 may depend on a chosen implementation.

At step 602, and as pictorially shown in FIGS. 3 and 4, a compression molding system 300 having a top mold 302 and a bottom mold 304 may be used to compression mold an aesthetically-pleasing in-mold decoration film 306 with a sheet structural material 308, similar to that of step 202 of method 200.

Figure 7:
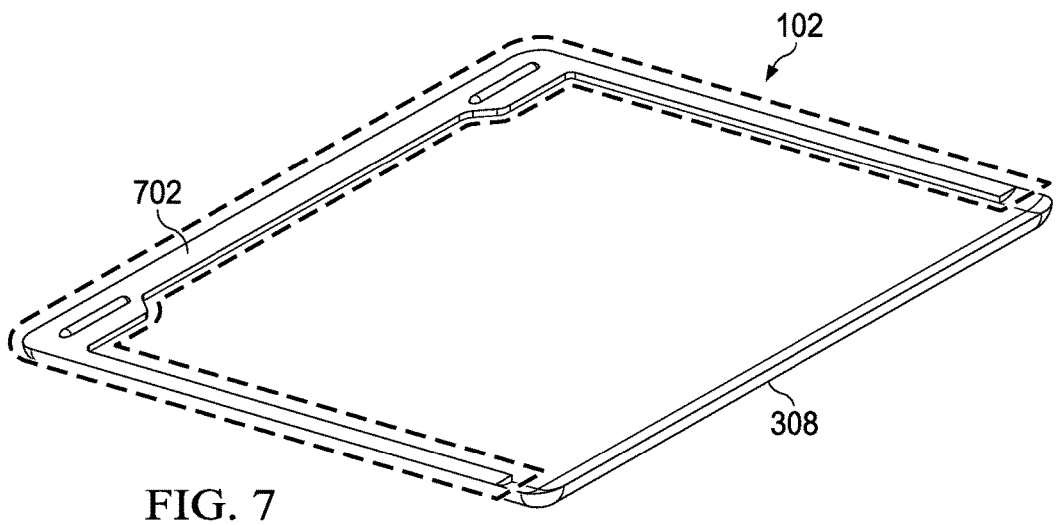
FIG. 7 illustrates an isometric view of an interior of a chassis structural member, with a mechanical attachment frame formed thereon using sheet molding compound, formed in accordance with the method of FIG. 6, in accordance with certain embodiments of the present disclosure.

At step 604, and as pictorially shown in FIG. 7, a chassis attachment frame 702 may be molded onto a side of structural material 308 opposite to that which in-mold decoration film 306 is bonded. Chassis attachment frame 702 may comprise sheet molding compound.

Figure 8:
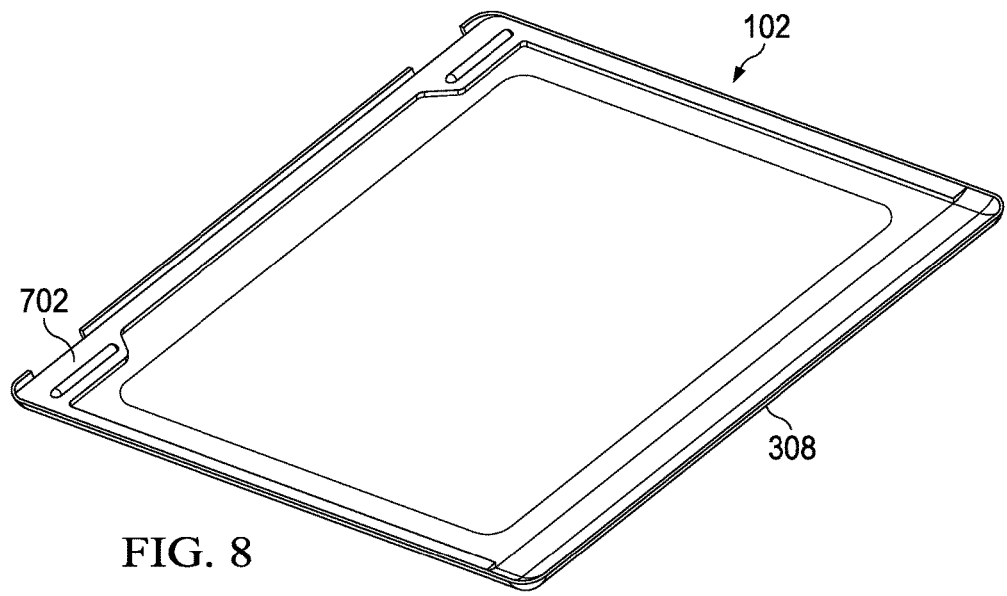
FIG. 8 illustrates a view of an interior of a chassis structural member, with a mechanical attachment frame formed thereon using sheet molding compound and computer numerical control, in accordance with certain embodiments of the present disclosure.

At step 606, and as pictorial shown in FIG. 8, computer numerical control (CNC) or an other method may be used to form attachment features of chassis attachment frame 702. After step 606, chassis attachment frame 702 may include one or more mechanical features for coupling structural member 102 to one or more components of information handling system 100. Because chassis attachment frame 702 is attached using molding of sheet molding compound instead of insertion molding, warping and distortion of structural material 308 may be reduced or eliminated as compared to traditional approaches.

Although FIG. 6 discloses a particular number of steps to be taken with respect to method 600, method 600 may be executed with greater or fewer steps than those depicted in FIG. 6. In addition, although FIG. 6 discloses a certain order of steps to be taken with respect to method 600, the steps comprising method 600 may be completed in any suitable order.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for forming a structural member, comprising: providing:
   a sheet of structural material between a top mold and a bottom mold, wherein a substantially rectangular perimeter of the sheet of structural material includes:
   a first edge, comprising a first side of the substantially rectangular boundary; and
   a second edge, comprising a second side of the substantially rectangular boundary, wherein the second side is substantially perpendicular to the first side;
   a top release film between the top mold and the sheet of structural material;
   a bottom release film between the bottom mold and the sheet of structural material; and
   an in-mold decoration film between the bottom release film and a bottom surface of the sheet of structural material; and
   compression molding the in-mold decoration film to the bottom surface of the sheet of structural material, wherein the in-mold decoration film extends to the first edge and includes a decoration film edge substantially parallel to the second edge of the sheet of structural material, wherein the decoration film edge defines a border of un-decorated structural material between the decoration film edge and the second edge.

2. The method of claim 1, further comprising molding a chassis attachment frame comprising sheet molding compound to the sheet of structural material.

3. The method of claim 2, further comprising forming attachment features to the chassis attachment frame after molding of the chassis attachment frame to the sheet of structural material.

4. The method of claim 3, wherein forming the attachment features comprises forming the attachment features using computer numerical control.

5. The method of claim 1, wherein the sheet of structural material comprises a fiber-reinforced polymer.

6. The method of claim 1, wherein the sheet of structural material comprises a thermoset polymer.

7. The method of claim 1, wherein the sheet of structural material comprises a layered composite structural material.

8. The method of claim 1, wherein an upper side of the in-mold decoration film comprises an adhesive for bonding to the lower surface of the sheet of structural material.

9. The method of claim 1, wherein the sheet of structural material includes a rounded second sidewall defining a convex curve terminating at the second edge.

10. The method of claim 9, wherein the sheet of structural material includes a rounded first sidewall, substantially perpendicular to the rounded second sidewall, wherein the rounded first sidewall defines a convex curve terminating at the first edge.

11. The method of claim 9, wherein the rounded second sidewall lies entirely within the border of un-decorated structural material between the decoration film edge and the second edge.

12. The method of claim 11, wherein the sheet of structural material includes a rounded first sidewall, substantially perpendicular to the rounded second sidewall, wherein the rounded first sidewall defines a convex curve terminating at the first edge.

13. The method of claim 1, wherein the sheet of structural material includes a rounded first sidewall defining a convex curve terminating at the first edge.

* * * * *